United States Patent [19]

Uehara

[11] Patent Number: 4,994,930

[45] Date of Patent: Feb. 19, 1991

[54] MECHANISM FOR ACTUATING A PROTECTIVE SHUTTER PROVIDED ON A CARTRIDGE ACCOMMODATING A DISK

[75] Inventor: Keiji Uehara, Iruma, Japan

[73] Assignee: TEAC Corporation, Japan

[21] Appl. No.: 280,874

[22] Filed: Dec. 7, 1988

[30] Foreign Application Priority Data

Dec. 9, 1987 [JP] Japan ............................ 62-187625[U]

[51] Int. Cl.[5] ...................... G11B 5/012; G11B 23/03
[52] U.S. Cl. ................................. 360/97.01; 360/133
[58] Field of Search .............. 360/97.01, 98.04, 99.02, 360/99.08, 99.12, 133; 369/291

[56] References Cited

U.S. PATENT DOCUMENTS

| | | | |
|---|---|---|---|
| 4,546,397 | 10/1985 | Asami et al. ..................... | 360/133 X |
| 4,622,607 | 11/1986 | Smith, II ........................ | 360/99.12 |
| 4,688,206 | 8/1987 | Nakagawa et al. ................ | 369/291 |
| 4,747,001 | 5/1988 | Kokubo et al. .................. | 360/98.04 |
| 4,823,214 | 4/1989 | Davis ............................... | 360/97.01 |

FOREIGN PATENT DOCUMENTS 62-15895  4/1987  Japan .

*Primary Examiner*—John H. Wolff

*Attorney, Agent, or Firm*—Andrus, Sceales, Starke & Sawall

[57] ABSTRACT

A mechanism for actuating a shutter of a cartridge accommodating an optical disk so as to expose a window defined in the cartridge responsive to an insertion of the cartridge into the apparatus and so as to cover the window responsive to the withdrawal of the cartridge from the apparatus. The mechanism comprises a base provided in a body of the information recording/reproducing apparatus. The base comprises a top plate defining a space for accepting the cartridge when the cartridge is inserted into the apparatus. An arm is held in said space so as to rotate freely relative to the base in a plane generally parallel to said top plate. The arm carries a projection adapted to engage with a corresponding depression formed on a front face of the shutter located at a front side of the cartridge which enters first into the space when the cartridge is inserted. A coiled spring urges the arm in a first direction opposing the rotation of the arm when the cartridge is inserted into said space. The spring further urges the arm in a second direction towards the top plate such that the arm maintains contact with an inner surface of said top plate which faces the space.

8 Claims, 4 Drawing Sheets

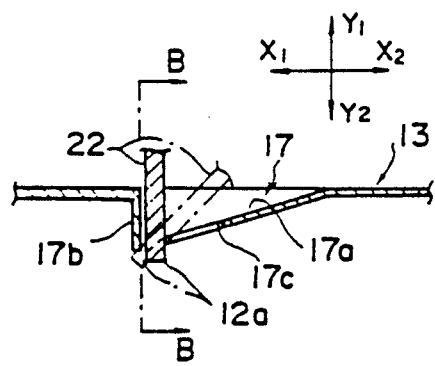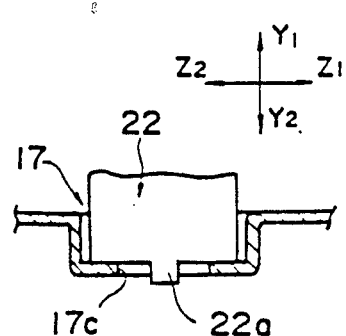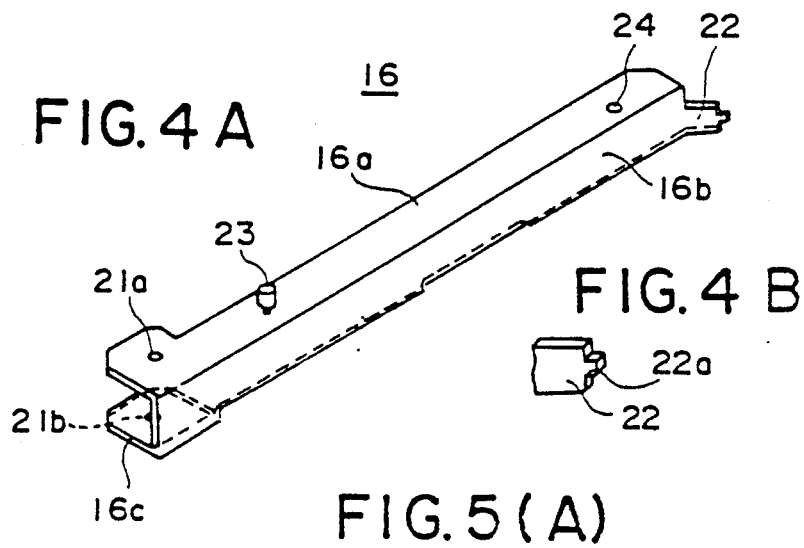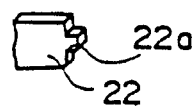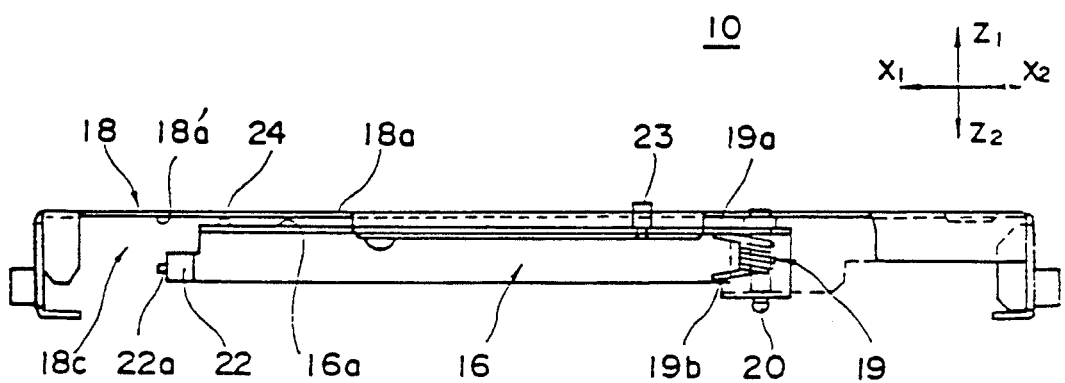

MECHANISM FOR ACTUATING A PROTECTIVE SHUTTER PROVIDED ON A CARTRIDGE ACCOMMODATING A DISK

BACKGROUND OF THE INVENTION

The present invention generally relates to information signal recording/reproducing apparatus for recording and/or reproducing an information signal on and from a disk-shaped rotary information recording medium accommodated in a cartridge, and particularly to a mechanism used in such an apparatus for actuating a protective shutter provided on the cartridge.

Conventionally, there is a 3.5 inch flexible magnetic disk accommodated in a cartridge. Such a cartridge has a window for allowing the magnetic disk in the cartridge to make contact with a magnetic head of a magnetic recording/reproducing apparatus for recording and/or reproducing an information signal on and from the disk. The window is closed by a protective shutter when the disk is not used in the apparatus. When the disk is inserted into the magnetic recording/reproducing apparatus for operation, the protective shutter is engaged with a pin provided at a tip end of an actuation arm constituting a member of a shutter actuating mechanism. With further insertion of the cartridge into the apparatus, the arm is pushed by the cartridge and swings in a first direction. Responsive to this swinging motion of the arm, the shutter engaged with the pin at the tip end of the arm is displaced and the window in the cartridge is exposed. When ejecting the cartridge from the magnetic recording/reproducing apparatus, the arm is swung in a second direction opposite to said first direction by an action of a spring urging the arm to its initial state responsive to the withdrawal of the cartridge from the apparatus. Responsive to the swinging motion of the arm in the second direction, the protective shutter, urged so as to close the window by an action of another spring in the cartridge, is closed again.

On the other hand, there is proposed an optical disk accommodated in a cartridge having a construction similar to the cartridge accommodating the 3.5 inch flexible magnetic disk. In such a cartridge designed for the optical disk, too, a window is formed on the cartridge so as to allow incidence of an optical beam on the disk for recording and/or reproducing of an information signal on and from the optical disk. Usually, the length of the window of such a cartridge measured in a direction $X_1$-$X_2$ as shown in FIG. 1 is larger than the corresponding length of the window of the cartridge accommodating the magnetic disk. Therefore, the extent or stroke of movement of the protective shutter is larger in the cartridge accommodating the optical disk as compared to the cartridge accommodating the magnetic disk. Accordingly, one needs a shutter actuating mechanism having an actuation arm with an extended arm length for actuating the protective shutter of the cartridge designed for accommodating the optical disk.

When the length of the actuation arm of the conventional shutter actuating mechanism is increased so as to adapt the mechanism to the cartridge accommodating the optical disk, there is a tendency that the arm, held rotatably on a holder which is a member of the optical recording and/or reproducing apparatus provided movably in the apparatus and into which the optical disk is inserted together with the cartridge, tends to be tilted relative to the holder due to the increased weight, and the parallelism between the actuation arm and the holder is lost. When the parallelism is lost, the pin at the tip end of the actuation arm does not engage properly with the shutter when the cartridge is inserted into the holder. More specifically, the pin at the tip end of the arm misses the engagement with a corresponding depression formed on the shutter. Thus, there is a substantial risk that the shutter is not smoothly opened or closed. As the thickness of the cartridge accommodating the optical disk, and therefore the size of the depression, is substantially reduced as compared to the thickness of the cartridge accommodating the magnetic disk, the problem of the pin at the tip end of the actuation arm missing the proper engagement with the corresponding depression in the protective shutter is particularly serious.

SUMMARY OF THE INVENTION

Accordingly, it is a general object of the present invention to provide a novel and useful shutter actuating mechanism for actuating a protective shutter provided on a cartridge accommodating an information recording disk therein, wherein the problems aforementioned are eliminated.

Another and more specific object of the present invention is to provide a shutter actuating mechanism for actuating a protective shutter provided on a cartridge accommodating an information recording disk therein, wherein the opening and closing of the shutter is achieved reliably.

Another object of the present invention is to provide a shutter actuating mechanism comprising an actuation arm held rotatably on a holder into which a cartridge accommodating an information recording disk therein is inserted, said the actuation arm being rotatable responsive to the insertion of the cartridge, an engaging part provided at a tip end of the actuation arm for engaging with a predetermined part defined on a protective shutter covering a window defined on the cartridge, and a spring means for urging the actuation arm in a first direction which is opposite to the direction of movement of the arm when the cartridge is inserted into the holder and further for urging the actuation arm in a second direction towards the holder such that the actuation arm maintains a stable contact with the holder and slides along a surface on the holder when it is moved responsive to the insertion of the cartridge. According to the present invention, the actuation arm is moved on a plane precisely defined relative to the surface of the holder and the engaging part at the tip end of the arm is reliably engaged with the corresponding part on the protective shutter. As a result, the opening and closing of the window by the protective shutter can be made smoothly and reliably.

Still other objects and further features of the present invention will become apparent from the following detailed description when read in conjunction with the attached drawings.

BRIEF DESCRIPTION OF THE DRAWINGS

FIGS. 3(A) and (B) are a bottom view and a side view showing a depression provided on the protective shutter for engagement with the mechanism of FIG. 1 in cross section;

FIG. 4(A) is an oblique view showing an actuation arm used in the shutter actuating mechanism of FIG. 1;

FIG. 4(B) is an enlarged view showing a part of the actuation arm in an enlarged scale;

FIG. 5(A) is a front view of the shutter actuating mechanism of FIG. 1;

DETAILED DESCRIPTION

Figure 1:
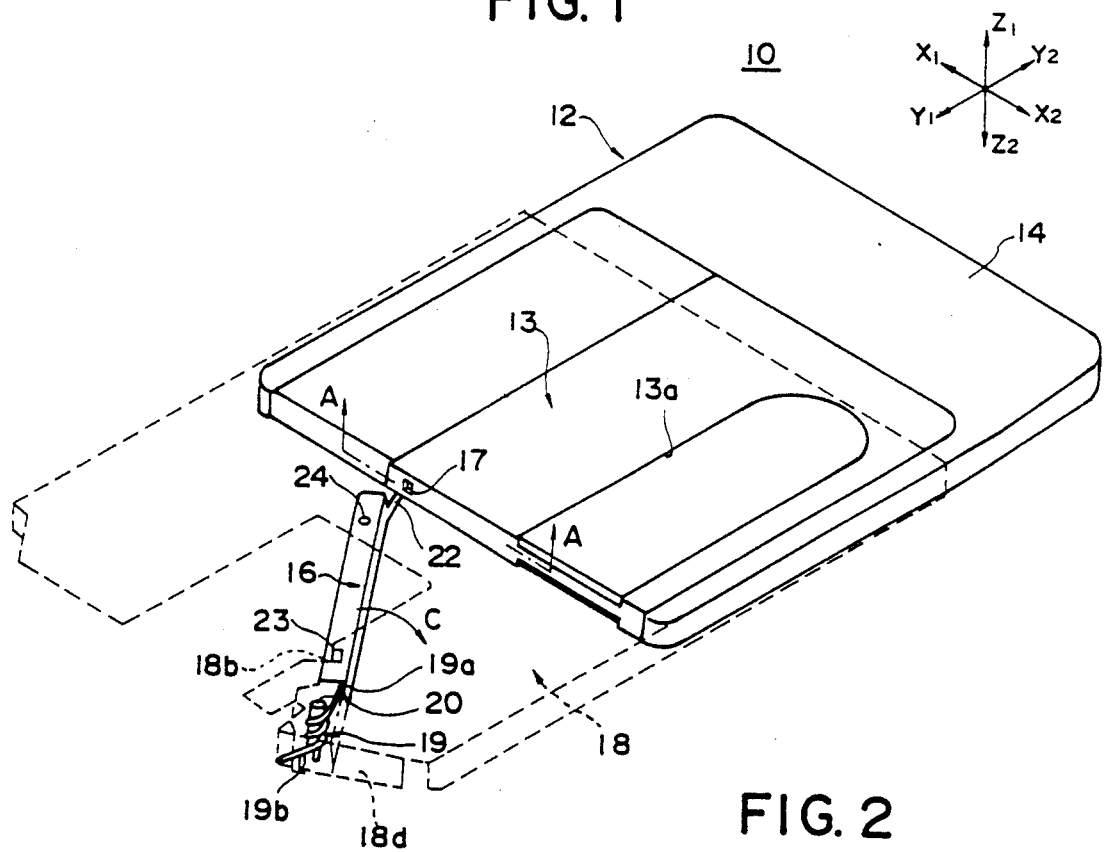
FIG. 1 is a perspective view showing an embodiment of a shutter actuating mechanism of the present invention.
Figure 2:
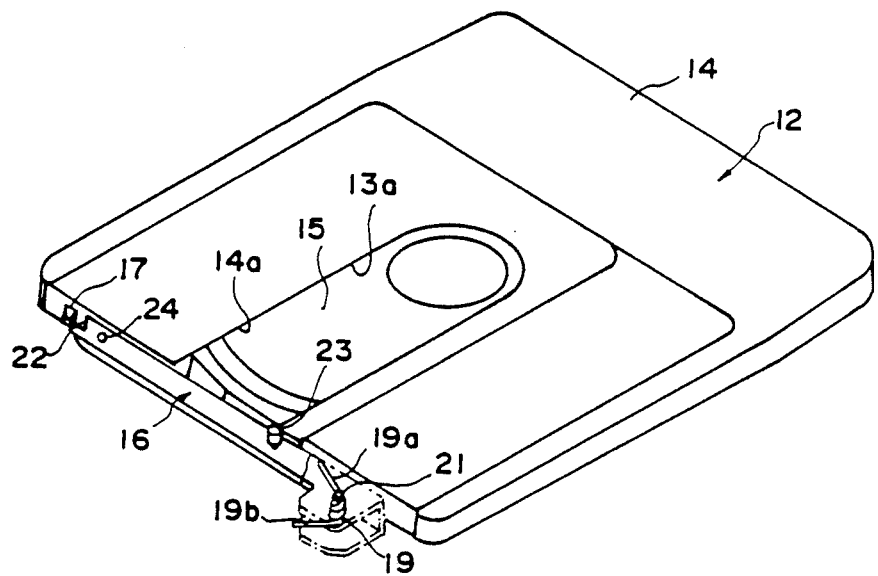
FIG 2 is a perspective view showing the shutter actuating mechanism of FIG. 1 in a state in which a protective shutter on a cartridge is opened.

FIGS. 1 and 2 show the shutter actuating mechanism of the present invention. Referring to the drawings, a shutter actuating mechanism 10 referred to hereinafter simply as a mechanism is provided on a holder which is a part of an optical information recording/reproducing apparatus not illustrated, and actuates a shutter 13 provided on a cartridge 12 when the cartridge is inserted into the apparatus. In the drawings, FIG. 1 represents a state in which the shutter is closed and FIG. 2 represents a state in which the shutter is opened.

Before starting substantial description of the mechanism 10, the disk cartridge 12 having the shutter 13 which is actuated by the mechanism 10 will be described at first. The disk cartridge 12 comprises a case 14 made of a hard plastic material, and the shutter 13 provided thereon is made of a metal. It can be seen from FIG. 2 that an optical disk 15 is accommodated in the case 14. The case 14 has an elongated opening or a window 14a extending along a center line of the case 14 from a front side of the case 14. This front side is the side of the cartridge 12 which enters first into the apparatus when the cartridge is inserted in a direction indicated by an arrow $Y_1$. Through this window 14a, the optical disk 15 is irradiated by an optical beam produced by the apparatus and recording and/or reproducing of an information signal on and from the disk is performed.

The shutter 13 made of a metal as aforementioned is provided on the case 14 close to the front side in a manner movable in $X_1$ and $X_2$ directions. It can be seen that the shutter 13 has a cutout 13a. Further, the shutter 13 is urged in a $X_2$ direction so as to close the window 14a by an urging means (not shown) provided in the case 14. Thus, the window 14a defined in the case 14 is usually closed by the shutter 13 and invasion of dust into the case 14 is prevented. Further, the shutter 13 protects the optical disk 15 in the case 14 from being damaged.

When recording and/or reproducing an information signal, the shutter 13 is displaced by the mechanism 10 in the $X_1$ direction against the urging force exerted by the urging means. When the shutter 13 is fully displaced, the cutout 13a of the shutter 13 is coincided with the window 14a and the optical disk 15 is exposed to the outside through the window 14a. Through this window 14a, the optical beam is irradiated on the disk 15 and recording and/or reproducing of an information signal on and from the optical disk 15 is performed by the optical beam. It should be noted that the window 14a and the cutout 13a are formed also on the other side of the cartridge 12 of FIG. 1 or 2, and it is through these window and cutout that the optical beam is actually irradiated on the optical disk 15 in the cartridge 12.

It should be noted that the shutter 13 has a depression 17a on its front side for engagement with an actuation arm 16 which is a member of the mechanism 10. FIGS. 3(A) and (B) show the depression 17 in an enlarged scale. It should be noted that these drawings represent the state in which the actuation arm 16 is engaged with the depression 17. As can be seen from FIG. 3(A) which is a cross sectional view seen from the bottom of the cartridge 12, the depression 17 is defined by a sloped wall 17a which increases its depth with increasing distance towards the $X_1$ direction. Further, the depression 17 is defined by a wall 17b which extends perpendicularly to the interior of the cartridge 12. At an inner most portion of the depression 17 where the sloped wall 17a and the wall 17b intersect one another, there is formed an aperture 17c having a predetermined size.

Next, the shutter actuating mechanism 10 which is the subject matter of the present invention will be described. The mechanism 10 generally comprises an actuation arm 16, a base provided on the optical recording/reproducing apparatus (shown in FIG. 1 by a phantom line) and a spring 19 for exerting force in two directions.

The base may be a holder 18 defining a space 18c (FIG. 5(A)) into which the cartridge 12 is inserted. This holder 18 in turn is mounted in the apparatus (not illustrated) movably, and transports the cartridge 12 inserted thereto together with the disk 15 to a predetermined position in the apparatus where the recording and/or reproduction is performed.

The actuation arm 16 is held rotatably on a shaft 20 extending into the space 18c from an inner surface 18a' of a top plate 18a (FIG. 5(A)) of the holder 18 which defines the space 18c. As already described, the stroke of the shutter 13 to open and close the window 14a of the cartridge 12 accommodating the optical disk 15 is longer as compared to the stroke of the shutter used in the cartridge accommodating the magnetic disk. Thus, the length of the actuation arm 16 is chosen longer as compared to the arm used in the corresponding shutter actuating mechanism which is used for actuating the shutter of the cartridge accommodating the magnetic disk.

FIG. 4(A) shows an enlargement of the actuation arm 16. As can be seen from the drawing, the arm 16 is an elongated member having a L-shaped cross section defined by a top wall 16a and a side wall 16b which faces the front side of the cartridge 12 when the cartridge is inserted into the holder 18, and a pair of openings 21a and 21b are formed on the top wall 16a and on a bottom wall 16c which in turn is provided on a base end of the arm 16 so as to accept the aforementioned shaft 20. Further, the arm 16 carries a projection 22 adapted to engage with the aforementioned depression 17 provided on the shutter 13 at the other end. The projection 22 extends obliquely from the arm 16 and extends perpendicularly to the front side of the cartridge 12 when the arm is rotated fully in the direction C indicated in FIG. 1 as will be described later. Furthermore, a pin 22a is provided at the tip end of the projection 22 so as to engage with the aperture 17c defined in the depression 17 as can be seen in FIG. 4(B). Further, a stopper pin 23 and a projection 24 to be described later are provided on an upper surface of the top wall 16a which faces the inner surface 18a' of the holder 18.

Figure 5B:
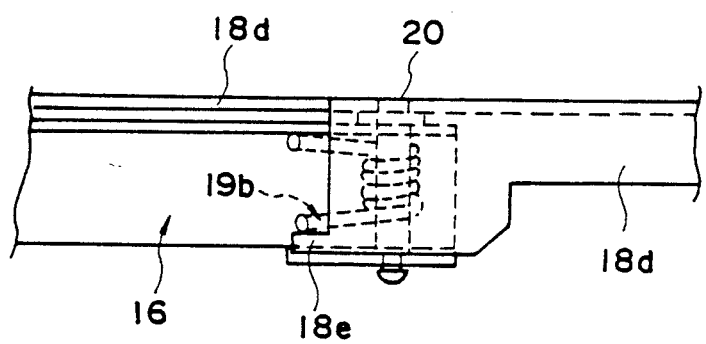
FIG. 5(B) is a front view showing a part of the shutter actuating mechanism of FIG. 1 in an enlarged scale.

FIG. 5(A) shows the actuation arm 16 in a state in which the arm 16 is provided on the holder 18. This drawing clearly illustrates the spring 19 wound around the shaft 20. The spring 19 has a construction generally similar to a coil spring and urges the arm 16 in the direction C in FIG. 1. Further, the spring exerts a force in $Z_1$ and $Z_2$ directions as well. One end 19a of the spring 19 is held by the actuation arm 16 by abutting with an L-shaped portion of the arm comprising the top and side walls 16a and 16b of the arm 16 and the other end 19b is held by the holder 18 by abutting with a projection 18e provided on a front wall 18d of the holder 18 (FIG. 5(B)). Thus, the spring 19 urges the arm 16 upwards relative to the holder 18 and the projection 24 formed on the upper wall 16a of the arm 16 makes a stable contact with the inner surface 18a' of the holder 18. Further, the level of the actuation arm 16 is defined unambiguously such that the arm 16 rotates in a plane extending parallel to the inner surface 18a' of the holder 18. Thus, the actuation arm 16 is moved parallel to the holder 18 in the plane which is separated from the holder 18 with a predetermined distance. At the same time, the spring 19 urges the arm in the direction C about the shaft 20 as shown in FIG. 1. It should be noted that the actuation arm 16 is thus urged in the direction opposite to the direction of rotation of the arm which occurs when the cartridge 12 is inserted into the holder 18. Further, the extent of the swinging or rotating motion of the actuation arm 16 is limited by the engagement of the stopper pin 23 with a corresponding depression 18b defined in the holder 18. In this engaged state, the further movement of the arm 16 in the direction C is prevented. This state will be referred to as a STANDBY state. The position of the stopper pin 23 and the corresponding depression 18b is determined such that the pin 22a of the projection 22 at the tip end of the arm 16 correctly engages with the corresponding aperture 17c of the depression 17 when the arm 16 is fully rotated in the direction C and the pin 23 and the depression 18b are engaged.

Figure 6:
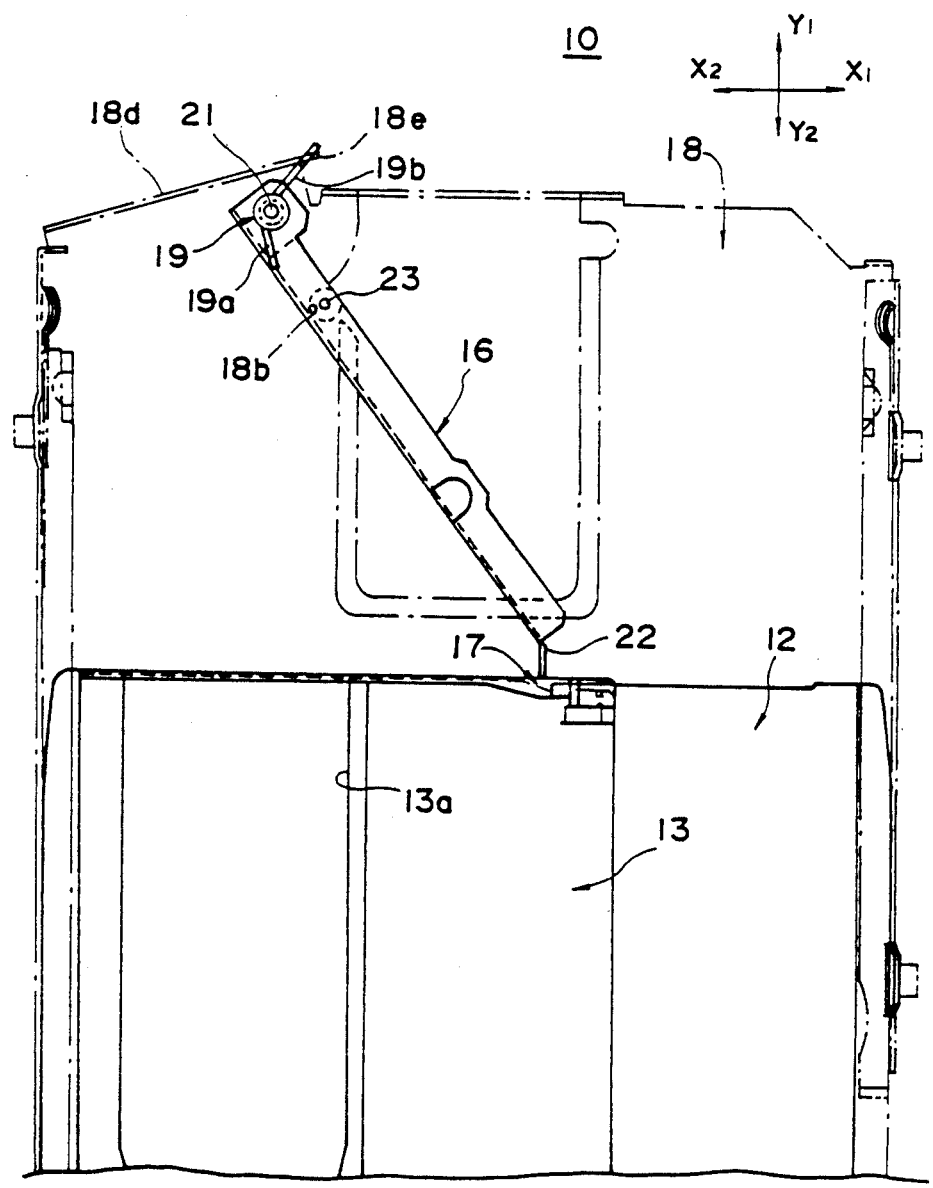
FIG. 6 is a plan view showing the shutter actuating mechanism of FIG. 1 in a state for waiting the insertion of the cartridge.

FIG. 6 shows the mechanism 10 in the STANDBY state. Referring to the drawing, the projection 22 at the tip end of the actuation arm 16 is located at a position ready to be accepted in the depression 17 formed on the shutter 13 of the cartridge 12 when the cartridge 12 is inserted. As already described, the position of the projection 22 in the STANDBY state is defined precisely relative to the depression 17 on the cartridge 12 to be inserted. Such a precise positioning is achieved firstly by engagement of the stopper pin 23 on the arm 16 with the depression 18b of the holder 18. Such an engagement restricts the position of the actuation arm 16 in the $X_1$ and $X_2$ directions. Further, the precise positioning in the $Z_1$ and $Z_2$ directions is achieved by contacting of the projection 24 on the arm 16 with the inner surface 18a' of the holder 18 which is caused as a result of urging by the spring 19. Furthermore, the degree of freedom in position of the cartridge 12 inserted into the holder 18 is restricted by the holder 18.

Thus, the projection 22 of the actuation arm 16 engages with the corresponding depression 17 smoothly and reliably when the cartridge 12 is inserted into the holder 18 in the $Y_1$ direction. In this state, the pin 22a at the tip end of the projection 22 is accepted in the aperture 17c formed in the depression 17. With a further insertion of the cartridge 12 in the $Y_1$ direction, the actuation arm 22 is pushed by the cartridge 22 and swings in the direction opposite to the direction C in FIG. 1. With the rotation of the arm 22, the projection 22 is displaced relative to the cartridge 12 in the $X_1$ direction and the shutter 13 is opened.

FIG. 2 shows a state in which the shutter 13 is completely opened. In this state, the actuation arm 16 and the front side of the cartridge 12 extend generally parallel to each other. Even in such a state, disengagement of the actuation arm 16 from the shutter 13 does not occur as the pin 22a on the projection 22 which projects obliquely from the arm 16 maintains the engagement with the aperture 17c in the depression 17 of the shutter 13.

FIG. 3(A) shows the engagement of the pin 22a and the aperture 17c. Immediately after the insertion of the cartridge 22, the pin 22a engages with the aperture 17c as shown in FIG. 3(A) by the solid line. As a result of the rotation of the actuation arm 16 associated with further insertion of the cartridge 12 into the holder 18, the angle between the pin 22a and the depression 17 changes and the pin 22a assumes a state as shown by the one-dotted line in FIG. 3(A) when the cartridge 22 is fully inserted into the holder 18. In other words, the pin 22a in inserted into the aperture 17c obliquely and a reliable engagement is established between the pin 22a and the wall portion 17b located at one side of the aperture 17c. Thus, any accidental disengagement of the actuation arm 16 from the shutter 13 at the time of opening the shutter is positively prevented and undesirable collision of the shutter 13 with optical element of the optical recording/reproducing apparatus during its operation is prevented.

When ejecting the cartridge 12 from the holder 18, the procedure aforementioned is performed in a reversed direction. Thus, the arm 16 is returned to the STANDBY state with the removal of the cartridge 12 from the holder 18 as a result of the action of the spring 19 urging the arm 16 in the direction C. Further, the shutter 13 is returned by the action of a spring (not shown) provided in the cartridge 12 and the window 14a is closed. Further description will be omitted as the procedure is exactly the opposite to the procedure at the time of insertion of the cartridge 12 into the holder 18.

Further, various variations and modifications may be made without departing from the scope of the present invention.

What is claimed:

1. A mechanism for use in an information recording-/reproducing apparatus, recording and/or reproducing an information signal on and from an information recording disk accommodated in a cartridge, for actuating a shutter of the cartridge so that a window defined in the cartridge is exposed responsive to an insertion of the cartridge into the apparatus and so that the window is covered responsive to the withdrawal of the cartridge from the apparatus, comprising:

a base having a front side and a rear side, said base having formed therein a space extending from the front side to the rear side, said space being defined, in part, by a top wall extending between the front side and the rear side such that the space is formed underneath the top wall, said base being provided in a body of the information recording/reproducing apparatus for accepting the cartridge inserted to said space from the rear side of the base to the front side of the base when the cartridge is inserted into the apparatus;

an arm held on the base so as to rotate freely in said space in a plane generally parallel to said top wall, said arm carrying a projection adapted to matingly cooperate with a depression formed at a front face of the shutter located at a front side of the cartridge which enters first into the space when the cartridge is inserted; and a coiled spring having a first end and a second end respectively secured on the base and the arm so as to urge the arm in a first direction opposing the rotation of the arm when the cartridge is inserted into said space and further in a second direction orthogonal to the first direction towards the top wall of the base such that the arm maintains a contact with said top wall which defines the space.

2. A mechanism as claimed in claim 1 in which said arm is held rotatably on a shaft provided on the base so as to extend into the space from said top wall, and said coiled spring is wound around the shaft.

3. A mechanism as claimed in claim 2 in which said arm comprises an elongated member having a top wall portion facing the top wall of the base and a side wall portion provided contiguous to the top wall portion so as to face the front side of the cartridge when the cartridge is fully inserted into the space, wherein the second end of said coiled spring is engaged with said top wall portion of the arm, and the first end of the spring is engaged with a front wall of the base which is a wall provided at the front side of the base contiguous to the top wall of the base so as to face the front side of the cartridge when the cartridge is fully inserted into the space.

4. A mechanism as claimed in claim 3 in which said the first end of the coiled spring engages with a L-shaped portion formed in the front wall of the base, said L-shaped portion being formed so as to support the first end of the coiled spring when the coiled spring exerts an urging force for urging the arm in the second direction.

5. A mechanism as claimed in claim 3 in which said arm carries a projection on said top wall portion of the arm so as to maintain a contact with the top wall of the base when the arm is rotated responsive to the insertion of the cartridge into the space.

6. A mechanism as claimed in claim 3 in which said arm carries a second projection on said top wall portion of the arm for engagement with a predetermined portion of the top wall of the base when the arm is rotated in the plane generally parallel to the top wall.

7. A mechanism as claimed in claim 3 in which said projection on the arm matingly cooperates with the depression of the cartridge when the arm is fully rotated in the first direction and the cartridge is fully inserted into the space in the base.

8. A mechanism as claimed in claim 1 in which said projection projects obliquely from the arm such that said projection extends perpendicularly to the front side of the cartridge when the arm is fully rotated in the first direction.

* * * * *